United States Patent
Weitlaner

(10) Patent No.: US 12,320,496 B2
(45) Date of Patent: Jun. 3, 2025

(54) SHADING AND ILLUMINATION SYSTEM

(71) Applicant: Hella Sonnen- und Wetterschutztechnik GmbH, Abfaltersbach (AT)

(72) Inventor: Robert Weitlaner, Ausservillgraten (AT)

(73) Assignee: HELLA SONNEN- UND WETTERSCHUTZTECHNIK GMBH, Abfaltersbach (AT)

( * ) Notice: Subject to any disclaimer, the term of this patent is extended or adjusted under 35 U.S.C. 154(b) by 742 days.

(21) Appl. No.: 17/510,908

(22) Filed: Oct. 26, 2021

(65) Prior Publication Data
US 2022/0128206 A1    Apr. 28, 2022

(30) Foreign Application Priority Data
Oct. 27, 2020  (AT) .............................. A 50925/2020

(51) Int. Cl.
*H05B 47/115*  (2020.01)
*E06B 9/24*  (2006.01)
(Continued)

(52) U.S. Cl.
CPC ............... *F21V 11/04* (2013.01); *E06B 9/24* (2013.01); *H05B 39/042* (2013.01); *H05B 47/11* (2020.01);
(Continued)

(58) Field of Classification Search
CPC .............................. H05B 47/115; H05B 47/11
See application file for complete search history.

(56) References Cited

U.S. PATENT DOCUMENTS

| 6,064,949 A | 5/2000 | Werner et al. |
| 8,164,818 B2 | 4/2012 | Collins et al. |

(Continued)

FOREIGN PATENT DOCUMENTS

| DE | 10 2014 220 818 | 4/2016 |
| EP | 2 760 164 | 3/2019 |

(Continued)

OTHER PUBLICATIONS

Research project DALEC (Day- and Artificial Light with Energy Calculation) Calculation program for selected working Points for year-round energy and comfort characterization buildings, URL: https://www.uibk.ac.at/bauphysik/forschung/projects/dalec/index.html.en.

(Continued)

*Primary Examiner* — Gary Collins
(74) *Attorney, Agent, or Firm* — Wenderoth, Lind & Ponack, L.L.P.

(57) ABSTRACT

A shading and illumination system includes a shading device for shading viewing openings, an illumination device for illuminating a room, an external sensor for detecting an external parameter acting on the room, an internal sensor for detecting a 3D image of the room, a position of a person present in the room in the 3D image, and a viewing direction of the person, and a control unit for actuating the shading device and the illumination device. The shading device and the illumination device are actuatable depending on the values measured by the external sensor and by the internal sensor. A light parameter acting on the person is determinable depending on the detected viewing direction, on the detected position, on the 3D image of the room, and on the external parameter. The shading device and/or the illumination device are/is actuatable depending on the light parameter acting on the person.

19 Claims, 4 Drawing Sheets

(51) Int. Cl.
  *F21V 11/04* (2006.01)
  *H05B 39/04* (2006.01)
  *H05B 47/11* (2020.01)
  *E06B 9/68* (2006.01)
  *F21S 11/00* (2006.01)

(52) U.S. Cl.
  CPC .... *H05B 47/115* (2020.01); *E06B 2009/6818* (2013.01); *E06B 2009/6827* (2013.01); *F21S 11/007* (2013.01)

(56) References Cited

U.S. PATENT DOCUMENTS

| | | | |
|---|---|---|---|
| 8,213,074 B1 | 7/2012 | Shrivastava et al. |
| 8,254,013 B2 | 8/2012 | Mehtani et al. |
| 8,643,933 B2 | 2/2014 | Brown |
| 8,705,162 B2 | 4/2014 | Brown et al. |
| 8,711,465 B2 | 4/2014 | Bhatnagar et al. |
| 8,810,889 B2 | 8/2014 | Brown |
| 8,864,321 B2 | 10/2014 | Mehtani et al. |
| 9,019,588 B2 | 4/2015 | Brown et al. |
| 9,030,725 B2 | 5/2015 | Pradhan et al. |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,158,173 B2 | 10/2015 | Bhatnagar et al. |
| 9,348,192 B2 | 5/2016 | Brown et al. |
| 9,412,290 B2 | 8/2016 | Jack et al. |
| 9,423,664 B2 | 8/2016 | Brown et al. |
| 9,436,054 B2 | 9/2016 | Brown et al. |
| 9,436,055 B2 | 9/2016 | Shrivastava et al. |
| 9,442,339 B2 | 9/2016 | Parker et al. |
| 9,442,341 B2 | 9/2016 | Shrivastava et al. |
| 9,454,055 B2 | 9/2016 | Brown et al. |
| 9,454,056 B2 | 9/2016 | Pradhan et al. |
| 9,477,131 B2 | 10/2016 | Pradhan et al. |
| 9,482,922 B2 | 11/2016 | Brown et al. |
| 9,513,525 B2 | 12/2016 | Collins et al. |
| 9,638,978 B2 | 5/2017 | Brown et al. |
| 9,645,465 B2 | 5/2017 | Brown et al. |
| 9,664,976 B2 | 5/2017 | Rozbicki |
| 9,671,665 B2 | 6/2017 | Brown et al. |
| 9,690,162 B2 | 6/2017 | Wilbur et al. |
| 9,703,167 B2 | 7/2017 | Parker et al. |
| 9,728,920 B2 | 8/2017 | Brown et al. |
| 9,778,532 B2 | 10/2017 | Pradhan |
| 9,885,935 B2 | 2/2018 | Jack et al. |
| 9,897,888 B2 | 2/2018 | Bhatnagar et al. |
| 9,910,336 B2 | 3/2018 | Parker et al. |
| 9,921,450 B2 | 3/2018 | Pradhan et al. |
| 9,927,674 B2 | 3/2018 | Brown et al. |
| 9,946,138 B2 | 4/2018 | Shrivastava et al. |
| D816,518 S | 5/2018 | Brown et al. |
| 9,958,750 B2 | 5/2018 | Parker et al. |
| 9,995,985 B2 | 6/2018 | Parker et al. |
| 10,001,691 B2 | 6/2018 | Shrivastava et al. |
| 10,002,297 B2 | 6/2018 | Sengupta |
| 10,048,561 B2 | 8/2018 | Brown |
| 10,120,258 B2 | 11/2018 | Jack et al. |
| 10,139,696 B2 | 11/2018 | Brown et al. |
| 10,139,697 B2 | 11/2018 | Wilbur et al. |
| 10,175,549 B2 | 1/2019 | Brown et al. |
| 10,180,606 B2 | 1/2019 | Mullins et al. |
| 10,241,375 B2 | 3/2019 | Collins et al. |
| 10,242,269 B2 | 3/2019 | Aggarwal et al. |
| 10,253,558 B2 | 4/2019 | Vigano et al. |
| 10,268,098 B2 | 4/2019 | Shrivastava et al. |
| 10,303,035 B2 | 5/2019 | Brown et al. |
| 10,320,231 B2 | 6/2019 | Rozbicki |
| 10,365,531 B2 | 7/2019 | Shrivastava et al. |
| 10,365,532 B2 | 7/2019 | Vigano et al. |
| 10,387,221 B2 | 8/2019 | Shrivastava et al. |
| 10,401,702 B2 | 9/2019 | Jack et al. |
| 10,409,130 B2 | 9/2019 | Parker et al. |
| 10,409,652 B2 | 9/2019 | Shrivastava et al. |
| 10,429,712 B2 | 10/2019 | Jack et al. |
| 10,444,589 B2 | 10/2019 | Parker et al. |
| 10,481,459 B2 | 11/2019 | Shrivastava et al. |
| 10,495,939 B2 | 12/2019 | Brown et al. |
| 10,503,039 B2 | 12/2019 | Jack et al. |
| 10,513,415 B2 | 12/2019 | Fang et al. |
| 10,514,582 B2 | 12/2019 | Jack et al. |
| 10,514,963 B2 | 12/2019 | Shrivastava et al. |
| 10,520,784 B2 | 12/2019 | Brown et al. |
| 10,520,785 B2 | 12/2019 | Pradhan et al. |
| 10,533,892 B2 | 1/2020 | Brown et al. |
| 10,539,456 B2 | 1/2020 | Klawuhn et al. |
| 10,539,854 B2 | 1/2020 | Brown et al. |
| 10,591,799 B2 | 3/2020 | Brown |
| 10,598,970 B2 | 3/2020 | Hainfellner |
| 10,631,379 B2 | 4/2020 | Deixler et al. |
| 10,673,121 B2 | 6/2020 | Hughes et al. |
| 10,678,103 B2 | 6/2020 | Mullins et al. |
| 10,684,524 B2 | 6/2020 | Collins et al. |
| 10,690,540 B2 | 6/2020 | Brown et al. |
| 10,704,322 B2 | 7/2020 | Vigano et al. |
| 10,712,627 B2 | 7/2020 | Brown et al. |
| 10,732,028 B2 | 8/2020 | Klawuhn et al. |
| 10,747,082 B2 | 8/2020 | Shrivastava et al. |
| 10,768,582 B2 | 9/2020 | Shrivastava et al. |
| 10,782,583 B2 | 9/2020 | Bhatnagar et al. |
| 10,797,373 B2 | 10/2020 | Hughes et al. |
| 10,802,372 B2 | 10/2020 | Brown |
| 10,809,587 B2 | 10/2020 | Brown et al. |
| 10,809,589 B2 | 10/2020 | Brown |
| 10,859,887 B2 | 12/2020 | Vigano et al. |
| 10,859,983 B2 | 12/2020 | Shrivastava et al. |
| 10,895,498 B2 | 1/2021 | Klawuhn et al. |
| 10,895,796 B2 | 1/2021 | Pradhan et al. |
| 10,901,286 B2 | 1/2021 | Parker et al. |
| 10,908,470 B2 | 2/2021 | Brown et al. |
| 10,908,471 B2 | 2/2021 | Vigano et al. |
| 10,935,864 B2 | 3/2021 | Shrivastava et al. |
| 10,935,865 B2 | 3/2021 | Pradhan et al. |
| 10,942,413 B2 | 3/2021 | Vigano et al. |
| 10,948,797 B2 | 3/2021 | Pradhan |
| 10,949,267 B2 | 3/2021 | Shrivastava et al. |
| 10,955,718 B2 | 3/2021 | Vigano et al. |
| 10,956,231 B2 | 3/2021 | Shrivastava et al. |
| 10,964,320 B2 | 3/2021 | Shrivastava et al. |
| 10,969,645 B2 | 4/2021 | Rozbicki et al. |
| 10,969,646 B2 | 4/2021 | Jack et al. |
| 10,989,976 B2 | 4/2021 | Shrivastava et al. |
| 10,989,977 B2 | 4/2021 | Shrivastava et al. |
| 11,003,041 B2 | 5/2021 | Vigano et al. |
| 11,016,357 B2 | 5/2021 | Brown et al. |
| 11,054,711 B2 | 7/2021 | Shrivastava et al. |
| 11,054,792 B2 | 7/2021 | Shrivastava et al. |
| 11,065,845 B2 | 7/2021 | Parker et al. |
| 11,067,869 B2 | 7/2021 | Brown et al. |
| 11,073,800 B2 | 7/2021 | Shrivastava et al. |
| 11,112,674 B2 | 9/2021 | Jack et al. |
| 11,114,742 B2 | 9/2021 | Shrivastava et al. |
| 11,126,057 B2 | 9/2021 | Brown et al. |
| 11,353,848 B1* | 6/2022 | Madden ................ H04N 7/183 |
| 2011/0148218 A1 | 6/2011 | Rozbicki |
| 2012/0026573 A1 | 2/2012 | Collins et al. |
| 2012/0062975 A1 | 3/2012 | Mehtani et al. |
| 2012/0147449 A1 | 6/2012 | Bhatnagar et al. |
| 2012/0182593 A1 | 7/2012 | Collins et al. |
| 2012/0236386 A1 | 9/2012 | Mehtani et al. |
| 2012/0239209 A1 | 9/2012 | Brown et al. |
| 2012/0293855 A1 | 11/2012 | Shrivastava et al. |
| 2012/0327499 A1 | 12/2012 | Parker et al. |
| 2013/0157493 A1 | 6/2013 | Brown |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2014/0015930 A1 | 1/2014 | Sengupta |
| 2014/0160550 A1 | 6/2014 | Brown et al. |
| 2014/0170863 A1 | 6/2014 | Brown |
| 2014/0192393 A1 | 7/2014 | Bhatnagar et al. |

(56) References Cited

U.S. PATENT DOCUMENTS

| | | |
|---|---|---|
| 2014/0236323 A1 | 8/2014 | Brown et al. |
| 2014/0247475 A1 | 9/2014 | Parker et al. |
| 2014/0268287 A1 | 9/2014 | Brown et al. |
| 2014/0303788 A1 | 10/2014 | Sanders et al. |
| 2014/0349497 A1 | 11/2014 | Brown et al. |
| 2014/0355097 A1 | 12/2014 | Brown et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092260 A1 | 4/2015 | Parker et al. |
| 2015/0103389 A1 | 4/2015 | Klawuhn et al. |
| 2015/0116811 A1 | 4/2015 | Shrivastava et al. |
| 2015/0118869 A1 | 4/2015 | Brown et al. |
| 2015/0185581 A1 | 7/2015 | Pradhan et al. |
| 2015/0234369 A1 | 8/2015 | Wen et al. |
| 2015/0270724 A1 | 9/2015 | Rozbicki |
| 2015/0293422 A1 | 10/2015 | Pradhan et al. |
| 2015/0346574 A1 | 12/2015 | Collins et al. |
| 2015/0346575 A1 | 12/2015 | Bhatnagar et al. |
| 2015/0346576 A1 | 12/2015 | Pradhan et al. |
| 2016/0054633 A1 | 2/2016 | Brown et al. |
| 2016/0054634 A1 | 2/2016 | Brown et al. |
| 2016/0070151 A1 | 3/2016 | Shrivastava et al. |
| 2016/0091769 A1 | 3/2016 | Rozbicki |
| 2016/0109778 A1 | 4/2016 | Shrivastava et al. |
| 2016/0124283 A1 | 5/2016 | Brown et al. |
| 2016/0139477 A1 | 5/2016 | Jack et al. |
| 2016/0154290 A1 | 6/2016 | Brown et al. |
| 2016/0195856 A1 | 7/2016 | Spero |
| 2016/0289042 A1 | 10/2016 | Fang et al. |
| 2016/0334689 A1 | 11/2016 | Parker et al. |
| 2016/0342060 A1 | 11/2016 | Collins et al. |
| 2016/0342061 A1 | 11/2016 | Pradhan et al. |
| 2016/0344148 A1 | 11/2016 | Mullins et al. |
| 2016/0357083 A1 | 12/2016 | Brown et al. |
| 2016/0377949 A1 | 12/2016 | Jack et al. |
| 2017/0006948 A1 | 1/2017 | Quinones |
| 2017/0045795 A1 | 2/2017 | Brown et al. |
| 2017/0075183 A1 | 3/2017 | Brown |
| 2017/0075323 A1 | 3/2017 | Shrivastava et al. |
| 2017/0082903 A1 | 3/2017 | Vigano et al. |
| 2017/0097259 A1 | 4/2017 | Brown et al. |
| 2017/0097553 A1 | 4/2017 | Jack et al. |
| 2017/0115544 A1 | 4/2017 | Parker et al. |
| 2017/0117674 A1 | 4/2017 | Brown et al. |
| 2017/0122802 A1 | 5/2017 | Brown et al. |
| 2017/0131610 A1 | 5/2017 | Brown et al. |
| 2017/0131611 A1 | 5/2017 | Brown et al. |
| 2017/0146884 A1 | 5/2017 | Vigano et al. |
| 2017/0168368 A1 | 6/2017 | Brown et al. |
| 2017/0212400 A1 | 7/2017 | Shrivastava et al. |
| 2017/0219907 A1 | 8/2017 | Brown et al. |
| 2017/0219908 A1 | 8/2017 | Brown et al. |
| 2017/0250163 A1 | 8/2017 | Wilbur et al. |
| 2017/0269451 A1 | 9/2017 | Shrivastava et al. |
| 2017/0276542 A1 | 9/2017 | Klawuhn et al. |
| 2017/0285432 A1 | 10/2017 | Shrivastava et al. |
| 2017/0285433 A1 | 10/2017 | Shrivastava et al. |
| 2017/0363897 A1 | 12/2017 | Martin |
| 2017/0364395 A1 | 12/2017 | Shrivastava et al. |
| 2017/0365908 A1 | 12/2017 | Hughes et al. |
| 2017/0371223 A1 | 12/2017 | Pradhan |
| 2018/0039149 A1 | 2/2018 | Jack et al. |
| 2018/0067372 A1 | 3/2018 | Jack et al. |
| 2018/0088432 A1 | 3/2018 | Shrivastava et al. |
| 2018/0090992 A1 | 3/2018 | Shrivastava et al. |
| 2018/0095337 A1 | 4/2018 | Rozbicki et al. |
| 2018/0101733 A1 | 4/2018 | Sengupta |
| 2018/0129172 A1 | 5/2018 | Shrivastava et al. |
| 2018/0143502 A1 | 5/2018 | Pradhan et al. |
| 2018/0157140 A1 | 6/2018 | Bhatnagar et al. |
| 2018/0157141 A1 | 6/2018 | Brown et al. |
| 2018/0187478 A1 | 7/2018 | Vigano et al. |
| 2018/0188627 A1 | 7/2018 | Vigano et al. |
| 2018/0188628 A1 | 7/2018 | Brown et al. |
| 2018/0189117 A1 | 7/2018 | Shrivastava et al. |
| 2018/0196325 A1 | 7/2018 | Parker et al. |
| 2018/0210307 A1 | 7/2018 | Parker et al. |
| 2018/0239965 A1 | 8/2018 | Aggarwal et al. |
| 2018/0267380 A1 | 9/2018 | Shrivastava et al. |
| 2018/0301858 A9 | 10/2018 | Mullins et al. |
| 2018/0307114 A1 | 10/2018 | Brown et al. |
| 2018/0314100 A1 | 11/2018 | Mullins et al. |
| 2018/0341163 A1 | 11/2018 | Jack et al. |
| 2018/0373111 A1 | 12/2018 | Brown |
| 2019/0011793 A1 | 1/2019 | Jack et al. |
| 2019/0011798 A9 | 1/2019 | Brown et al. |
| 2019/0025661 A9 | 1/2019 | Brown et al. |
| 2019/0025662 A1 | 1/2019 | Jack et al. |
| 2019/0049811 A9 | 2/2019 | Shrivastava et al. |
| 2019/0049812 A1 | 2/2019 | Brown |
| 2019/0056631 A1 | 2/2019 | Brown et al. |
| 2019/0115786 A1 | 4/2019 | Rozbicki |
| 2019/0121214 A1 | 4/2019 | Wilbur et al. |
| 2019/0124749 A1 | 4/2019 | Deixler et al. |
| 2019/0138704 A1 | 5/2019 | Shrivastava et al. |
| 2019/0155122 A1 | 5/2019 | Brown et al. |
| 2019/0196292 A1 | 6/2019 | Brown et al. |
| 2019/0203528 A1 | 7/2019 | Vigano et al. |
| 2019/0204705 A1 | 7/2019 | Vigano et al. |
| 2019/0219881 A1 | 7/2019 | Shrivastava et al. |
| 2019/0235343 A1 | 8/2019 | Vigano et al. |
| 2019/0235451 A1 | 8/2019 | Shrivastava et al. |
| 2019/0243204 A1 | 8/2019 | Collins et al. |
| 2019/0243206 A1 | 8/2019 | Brown et al. |
| 2019/0243207 A1 | 8/2019 | Brown et al. |
| 2019/0250029 A1 | 8/2019 | Zedlitz et al. |
| 2019/0267840 A1 | 8/2019 | Rozbicki et al. |
| 2019/0271895 A1 | 9/2019 | Shrivastava et al. |
| 2019/0294017 A1 | 9/2019 | Vigano et al. |
| 2019/0294018 A1 | 9/2019 | Shrivastava et al. |
| 2019/0317458 A1 | 10/2019 | Shrivastava et al. |
| 2019/0319335 A1 | 10/2019 | Hughes et al. |
| 2019/0324342 A1 | 10/2019 | Jack et al. |
| 2019/0331978 A1 | 10/2019 | Shrivastava et al. |
| 2019/0346732 A1 | 11/2019 | Parker et al. |
| 2019/0346734 A1 | 11/2019 | Shrivastava et al. |
| 2019/0347141 A1 | 11/2019 | Shrivastava et al. |
| 2019/0353972 A1 | 11/2019 | Shrivastava et al. |
| 2019/0356508 A1 | 11/2019 | Trikha et al. |
| 2019/0384232 A1* | 12/2019 | Casey ............... G06V 10/60 |
| 2019/0384652 A1 | 12/2019 | Shrivastava et al. |
| 2019/0391456 A1 | 12/2019 | Parker et al. |
| 2020/0001687 A1* | 1/2020 | Chow ............... B60Q 1/544 |
| 2020/0004096 A1 | 1/2020 | Brown et al. |
| 2020/0026141 A1 | 1/2020 | Brown et al. |
| 2020/0041861 A1 | 2/2020 | Shrivastava et al. |
| 2020/0041963 A1 | 2/2020 | Shrivastava et al. |
| 2020/0041967 A1 | 2/2020 | Shrivastava et al. |
| 2020/0057346 A1 | 2/2020 | Zedlitz et al. |
| 2020/0057421 A1 | 2/2020 | Trikha et al. |
| 2020/0073193 A1 | 3/2020 | Pradhan et al. |
| 2020/0080364 A1 | 3/2020 | Shrivastava et al. |
| 2020/0089074 A1 | 3/2020 | Pradhan et al. |
| 2020/0096831 A1 | 3/2020 | Brown et al. |
| 2020/0150508 A1 | 5/2020 | Patterson et al. |
| 2020/0150602 A1 | 5/2020 | Trikha et al. |
| 2020/0200595 A1 | 6/2020 | Klawuhn et al. |
| 2020/0209057 A1 | 7/2020 | Brown et al. |
| 2020/0259237 A1 | 8/2020 | Shrivastava et al. |
| 2020/0278245 A1 | 9/2020 | Brown et al. |
| 2020/0301234 A1* | 9/2020 | McNeil ............... E06B 9/24 |
| 2020/0301236 A1 | 9/2020 | Brown et al. |
| 2020/0310213 A1 | 10/2020 | Shrivastava et al. |
| 2020/0310214 A1 | 10/2020 | Brown |
| 2020/0318426 A1 | 10/2020 | Vigano et al. |
| 2020/0321682 A1 | 10/2020 | Hughes et al. |
| 2020/0348574 A1 | 11/2020 | Bhatnagar et al. |
| 2020/0355977 A1 | 11/2020 | Brown et al. |
| 2020/0363261 A1 | 11/2020 | Klawuhn et al. |
| 2020/0387041 A1 | 12/2020 | Shrivastava et al. |
| 2020/0393719 A1 | 12/2020 | Mullins et al. |
| 2020/0393733 A1 | 12/2020 | Brown |

(56) References Cited

U.S. PATENT DOCUMENTS

| | | |
|---|---|---|
| 2020/0398535 A1 | 12/2020 | Collins et al. |
| 2021/0003899 A1 | 1/2021 | Zedlitz et al. |
| 2021/0018880 A9 | 1/2021 | Shrivastava et al. |
| 2021/0040789 A1 | 2/2021 | Rozbicki et al. |
| 2021/0041759 A1 | 2/2021 | Trikha et al. |
| 2021/0055619 A1 | 2/2021 | Brown |
| 2021/0063834 A1 | 3/2021 | Brown et al. |
| 2021/0063835 A1 | 3/2021 | Vigano et al. |
| 2021/0063836 A1 | 3/2021 | Patterson et al. |
| 2021/0072611 A1 | 3/2021 | Brown |
| 2021/0080319 A1 | 3/2021 | Brown et al. |
| 2021/0080793 A1 | 3/2021 | Pradhan et al. |
| 2021/0108960 A1 | 4/2021 | Klawuhn et al. |
| 2021/0116769 A1 | 4/2021 | Shrivastava et al. |
| 2021/0116770 A1 | 4/2021 | Pradhan et al. |
| 2021/0119318 A1 | 4/2021 | Hughes et al. |
| 2021/0132458 A1 | 5/2021 | Trikha et al. |
| 2021/0149266 A1 | 5/2021 | Brown et al. |
| 2021/0165696 A1 | 6/2021 | Shrivastava et al. |
| 2021/0174804 A1 | 6/2021 | Shrivastava et al. |
| 2021/0181593 A1 | 6/2021 | Pradhan |
| 2021/0191214 A1 | 6/2021 | Rozbicki et al. |
| 2021/0191218 A1 | 6/2021 | Trikha et al. |
| 2021/0191221 A1 | 6/2021 | Shrivastava et al. |
| 2021/0208467 A1 | 7/2021 | Shrivastava et al. |
| 2021/0208468 A1 | 7/2021 | Jack et al. |
| 2021/0215990 A1 | 7/2021 | Parker et al. |
| 2021/0232015 A1 | 7/2021 | Brown et al. |
| 2021/0246719 A1 | 8/2021 | Shrivastava et al. |
| 2021/0255519 A1 | 8/2021 | Vigano et al. |
| 2021/0294172 A1 | 9/2021 | Rasmus-Vorrath et al. |
| 2021/0294173 A1 | 9/2021 | Trikha et al. |
| 2021/0294174 A1 | 9/2021 | Brown et al. |

FOREIGN PATENT DOCUMENTS

| | | |
|---|---|---|
| KR | 10-1049496 | 7/2011 |
| WO | 2016/058695 | 4/2016 |
| WO | 2016/174215 | 11/2016 |
| WO | 2017/174412 | 10/2017 |
| WO | 2019/183232 | 9/2019 |
| WO | 2019/183289 | 9/2019 |

OTHER PUBLICATIONS

Presence or motion detection/absence automatisms: optical sensors from Steinel with the type designation "HDP2 KNX".

Tracking of movement and temperature of people and objects: Company infsoft GmbH "Infrared Thermopile Sensor", URL: https://www.infsoft.com/technology/condition-monitoring/presence-motion-monitoring/infrared-thermopile.

English abstract of EN 14501:2021, "Blinds and shutters- Thermal and visual comfort- Performance characteristics and classification".

English abstract of EN 17037:2018, "Daylight in buildings".

Delta-T Devices, Outdoor sensor (pyranometer), "SPN1 Sunshine Pyranometer", URL: https://delta-t.co.uk/product/spn1/.

* cited by examiner

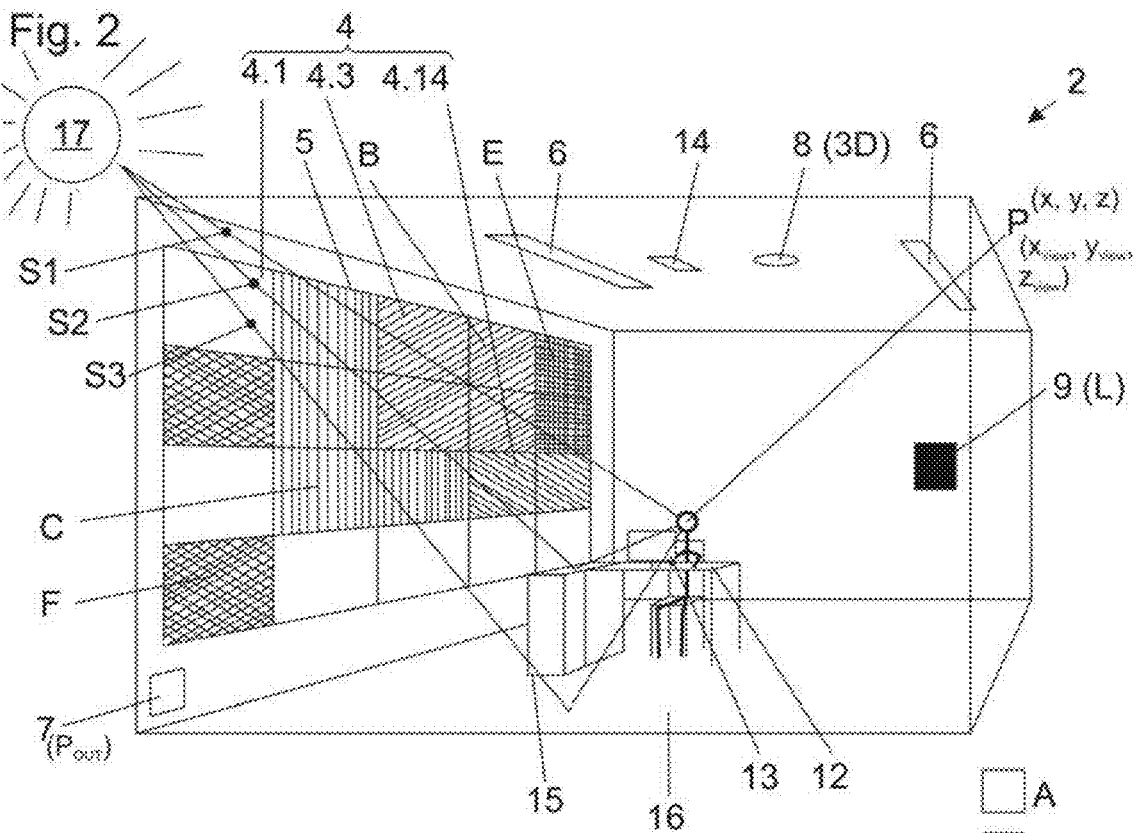
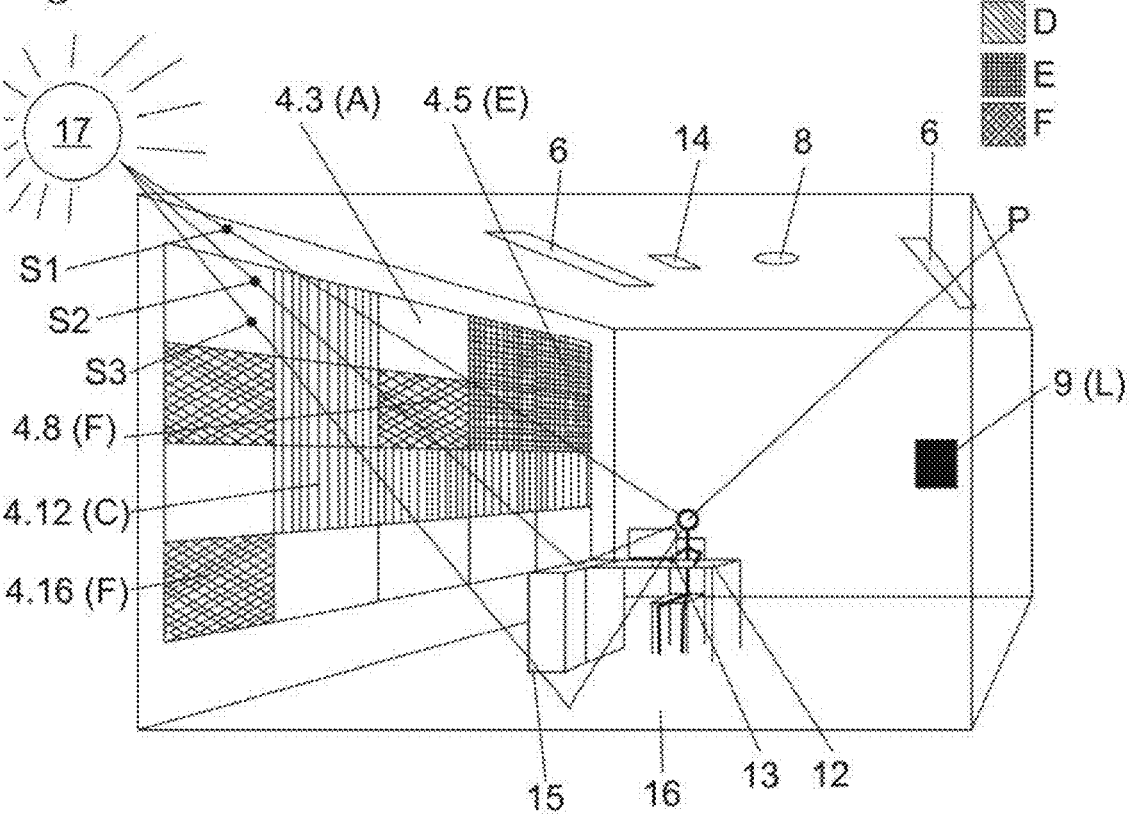

Fig. 6
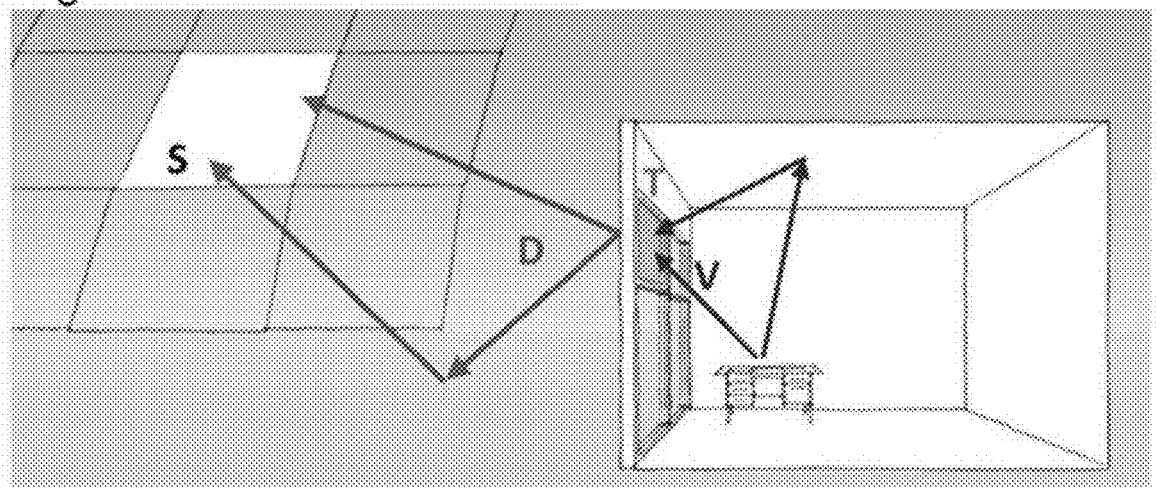
Fig. 7
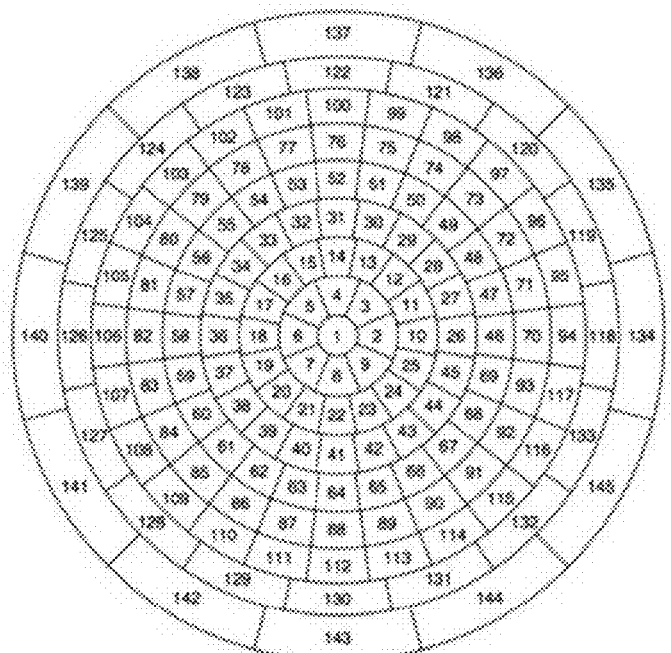
Fig. 8
| V | T | D | s |
|---|---|---|---|
| (n × 145) | (145 × 145) | (145 × 145 or 2306) | (145 or 2306 × 1) |
| view matrix | trans. matrix (bsdf) | daylight matrix | weather data |

SHADING AND ILLUMINATION SYSTEM

BACKGROUND OF THE INVENTION

The present invention relates to a shading and illumination system for a room in a building with at least one shading device for shading viewing openings, in particular windows, of the building, at least one illumination device for illuminating the room, at least one external sensor for detecting at least one external parameter acting on the room from outside, at least one internal sensor for detecting a 3D image of the room, at least one position of a person present in the room in this 3D image and a viewing direction of this at least one person and a control unit for actuating the at least one shading device and the at least one illumination device. The at least one shading device and the at least one illumination device are actuatable by the control unit depending on the values measured by the external sensor and by the internal sensor. The invention also relates to a building automation system for monitoring, controlling and adjusting facilities in a building, and this building automation system has such a shading and illumination device.

Shading and illumination systems are used in a variety of ways in buildings to give the persons present therein a pleasant residential experience. In a work environment in particular, it is essential that the shading and the illumination are well balanced. This means that in the case of strong solar radiation the shading is to prevent considerable heat generation and glare, while at the same time as much daylight as possible is to be available to illuminate the room. To achieve target illumination levels, artificial light is added effectively and efficiently: in short, intelligent shading is sought.

When working in an office environment, a person is to be protected from glare as much as possible. In scientific circles and in one European standard (EN 17037), the so-called daylight glare probability (DGP for short) is considered to be an indication of glare, wherein a value of below 0.40 should be achieved. Excessive heating to above 28° C. is also to be avoided in order to protect against long-term physical harm. Protective mechanisms are already used for this (e.g. glare protection is set to active or a sunshade is lowered, or the like). In the state of the art, such protective mechanisms are based on the detection of people at their workstation. This is effected, for example, via presence or movement detection or via automatic absence processes. In this case, optical sensors from Steinel with the type designation HDP2 KNX are used, for example, with which the number of people in a room can be detected.

The company infsoft GmbH for example offers an "infrared thermopile sensor" which can be used to track movement and temperature of persons and objects. The infrared sensor measures the current temperature as well as temperature gradients within the field of vision and represents the temperature distribution in corresponding colours. So-called presence detectors based on passive infrared (PIR) detect physical presence in the internal area and are suitable for offices, public buildings, corridors, storerooms and washrooms. One of the most frequent applications is presence-dependent and energy-efficient light control. Presence detection has a considerable effect in respect of reducing the artificial light requirement. If necessary, the artificial light system is added to the daylight until the target illuminance is reached. Ultrasonic sensors detect persons, objects or fill levels with high precision and over a wide distance range, even in the presence of fog, dirt or dust.

Nowadays, a certain degree of individualization is also achieved by using localization features of smartphones. The person or occupant saves basic settings in their smartphone, which are then applied at each of their workstations/residence areas.

With regard to visual comfort, however, presence detection is too little. Glare is a phenomenon which depends on the outside space and its light sources and brightness distribution, the position in the interior space, the viewing direction and the entire interior of the room. Models for this are e.g. the daylight glare probability of EN 17037 or vertical illuminance levels as estimators. It is disadvantageous to close the entire façade in order to implement the glare protection function—when the position of the sun is known. As a result, an increased artificial light requirement arises because of lower daylight illuminance levels and contact with the outside world is restricted (requirement definition in EN 14501).

With regard to energy flow optimization, partial aspects of the science are known. For example, in the calculation program provided by the research project DALEC (Day- and Artificial Light with Energy Calculation), the year-round energy and comfort characterization of buildings becomes possible for selected working points (www.dalec.net). There, the energy flow through the façade is calculated using angle-dependent overall energy transmittances, wherein angle dependence is to be considered within the meaning of angle of incidence and also positioning angle.

Korean patent KR 10-1049496 B1 describes in detail that the energy flows can be optimized in a time step on the basis of external and internal data and heating loads from the building management system, taking various temporary or thermal comfort criteria into account. Based on external weather data and internal room data including information about the users (distance from the window and viewing direction as an angle to the window), control of the sunshade can be optimized on the basis of a target function between comfort and energy.

US 2018/0101733 A1 describes a method for detecting persons in front of monitors from the perspective of security and authentication.

WO 2019/183232 A1 describes a method for the zonal control of switchable glass panes on the basis of cloud cover. It is described here that a building management system (BMS) operates to maintain a comfortable environment for the users while at the same time minimizing heating and cooling costs.

US 2018/0157141 A1 describes a BMS (building management system) that displays a multipurpose controller for multistate windows.

U.S. Pat. No. 10,242,269 B2 describes the coordinative occupant detection by means of IR technology to control artificial light and other environmental parameters in a house.

U.S. Pat. No. 10,513,415 B2 describes in detail sensor technology for detecting persons and its application in passenger control.

US 2016/0195856 A1 describes a multisystem which observes the user and also his/her viewing direction. An ergonomic consideration is also effected. A display can change the position after a period of time in order to reduce a lasting stiff posture of the user.

WO 2019/183289 A1 describes a control system with a 3D outside space model.

Individual zones of windows are controlled via a switchable glass pane. The interior space calculation is effected via predefined areas in which the user is to be expected.

EP 2 760 164 B1 describes an intuitive and self-learning residential and building comfort control, as well as encrypted, wireless or wired data transmission.

WO 2016/058695 A1 discloses a device and a method for reducing the glare effect in a room of a building. The light source can be dimmed in a pixelated manner. The calculation provides that a camera is then used to investigate whether shadows are falling on the users. The ergonomic advantage is seen in the fact that complete dimming is not necessary.

SUMMARY OF THE INVENTION

The object of the present invention is now to develop a shading and illumination system which is improved compared with the state of the art. In particular, the known disadvantages are to be at least partly avoided. A control of the system which is as automated, simple and efficient as possible is to be possible.

According to the invention, a light parameter acting on the person, in particular on an eye of the person, is determined depending on the viewing direction detected and the detected position and the 3D image of the room and depending on the at least one external parameter, wherein the at least one shading device and/or the at least one illumination device are/is actuatable depending on this light parameter acting on the person.

An individual light parameter geared to the at least one person in the room is thus determined by the system. This light parameter then serves as the basis for the shading and/or illumination. Even if several persons are present in the room, an individual (and in each case current) light parameter can be determined for each of these persons, whereupon an individual adaptation of the shading and/or illumination is effected.

The external parameter can comprise one or more values. With respect to the illumination, at least one radiometric quantity or a photometric equivalent should be incorporated in the external parameter. In addition (or alternatively) the external temperature can be incorporated in the external parameter.

Specifically, preferably the at least one external parameter is based on an irradiance and/or an illuminance and/or a radiation density (or radiation density distribution) and/or an external temperature.

The irradiance (E) (also radiant flux density) is the term for the overall power of the incoming electromagnetic energy which is incident on a surface relative to the size of the surface. The irradiance is indicated in watts per square metre and represents a radiometric quantity.

In contrast to this, the illuminance is the photometric equivalent. The illuminance $E_v$, on the one hand, describes the surface-related luminous flux which is incident on an illuminated object. The luminous intensity, on the other hand, describes the solid-angle-related luminous flux of a light source. The SI unit of illuminance is the lux (lx).

The radiance or radiation density (L) (also specific intensity) supplies detailed information about the location dependence and direction dependence of the radiation emitted by an emitter surface. The radiation density indicates what radiant power is emitted from a given point of the radiation source in the direction given by the polar angle and the azimuth angle per surface element projected and per solid angle element. The radiation density is indicated in watts per square metre and per steradian. The radiation density is a radiometric quantity. The luminance—indicated in $cd/m^2$—forms the photometric equivalent.

In addition, to the exemplary external parameters mentioned, additionally (or alternatively) the luminous density, luminous intensity, radiant intensity or other radiometric quantities or their photometric equivalent can also be used. If the external temperature is also used as an external parameter, this can, for example, be recorded in degrees Celsius or Kelvins.

Furthermore, preferably the at least one external parameter represents values measured and/or calculated by the external sensor, and/or conditions based on the irradiance and/or the illuminance and/or the radiation density and/or the external temperature. This means that these values can also be partly based on calculations and include particular relationships between different values (e.g. direct components to diffuse components; one quarter space to another quarter space).

In principle, only one external sensor must be provided. However, this can by all means be arranged in the room of the building, as long as an adequate view of the environment outside the room is possible.

Several external sensors can also be provided, with which different values are detected or which are directed to different areas of the environment. These values can be processed together (offset) or individually.

Specifically, the at least one external sensor is a pyranometer. Reference may be made here to the "SPN1 Sunshine Pyranometer" from "Delta-T Devices".

Values which refer to the time of day, the position of the sun and/or the geographical position of the building on the globe can also be incorporated in the external parameter. These do not have to be detected in an ongoing manner but can be stored or read out or retrieved via the Internet in an ongoing manner.

A similar fixed value can be stored for the horizon (from the location of the building). Therefore, also mountains and adjacent buildings can continually be taken into consideration as shade providers. Adjacent buildings can be added in the event of a change, and then remain fixed/static again.

With regard to the at least one internal sensor, it is in principle possible that similar radiometric or photometric quantities can be detected with this internal sensor.

It is preferably provided that the at least one internal sensor for detecting the 3D image is a ToF camera. ToF cameras are 3D camera systems using time of flight (ToF for short) techniques. To this end, the scene—in this case the room in the building—is illuminated by means of a light pulse, and for each pixel the camera measures the time that the light takes to the object and back again. The time required is directly proportional to the distance. For each pixel the ToF camera thus supplies the distance of the object imaged thereon. A three-dimensional point cloud is produced by this ToF camera. The intensity of the reflected beam gives an indication of the optical reflectance of the material.

Also, several ToF cameras can be arranged in the room. Several point clouds can be produced thereby, which are then combined into a more complete 3D image by fusion. Other methods could also be used for the 3D generation, e.g. 4D radar or the LIDAR system.

In principle, it is possible for the internal sensor in the form of the ToF camera to also detect the position of the person in the room. In addition (or alternatively), however, a further internal sensor in the form of a presence detector can be arranged in the room. With this presence detector, several persons can be detected in the room and their position in the room can be determined. The data of the presence detector can then be combined with those of the ToF camera.

Preferably, several internal sensors are arranged in the room to detect several persons.

The data of the ToF camera and/or of the presence detector can preferably be used to also determine the viewing direction of the person(s).

Furthermore, preferably the 3D image contains surfaces arranged in a coordinate system, wherein reflectances of these surfaces of the room are determinable via the at least one internal sensor, preferably by estimation or calculation. Specifically, a particular reflection value per pixel (e.g. 340×680 VGA) can be determined here.

The parameters mentioned hitherto refer to detected values which depend directly on the locations of the respective sensors, wherein starting from these locations a good overview of the conditions outside and inside the room of the building is certainly provided.

An important factor now, however, is what the condition is like in the area occupied by the person(s). The parameters in the area of the eye or face of the person(s) are particularly important in this case.

To this end, preferably, from the external parameters and internal parameters (3D image, position and viewing direction) made available by the at least one external sensor and the at least one internal sensor, an individual light parameter is determined for that position or that area where the face (or the eyes) of the person(s) is located.

Preferably, the light parameter corresponds to an illumination parameter. An illumination parameter can be a non-photometric, biologically active parameter (which includes e.g. the melanopic potential, wherein the melanopic efficiency factor is a measure of the circadian effect of a light source).

It is particularly preferable that the illumination parameter is defined by the vertical illuminance. Here the three-phase method (Three-Phase Method for Simulating Complex Fenestration with Radiance) can be used to determine the vertical illuminance (this will be explained in greater detail further below in the description of the figures).

However, not only is the illumination in the area of the person(s) relevant, but also the glare. It is therefore alternatively (or additionally) preferable that the light parameter corresponds to a glare parameter, wherein this glare parameter is defined on the basis of a daylight glare probability or other glare metrics. The luminance and the solid angle as well as the vertical illuminance are incorporated in the calculation of this daylight glare probability. The formula consists qualitatively of the sum of luminance at the solid angle×solid angle×location weighting factor+vertical illuminance. The luminance is calculated in turn from the 3D image with the surface properties (reflectance) and the data of the external parameter depending on the viewing direction and position of the person(s).

Anything that can change the radiation transmission into the building can be used as shading device. Any artificial light source can be used as illumination device.

It is preferable that the shading device is formed as a mechanical shading element (e.g. as a venetian blind, curtain, awning, roller shutter, roller blind, vertical venetian blind or pleated blind) and/or as intelligent glass.

Intelligent glass (also known as smart glass or dynamic glass) denotes tintable glazing, the light and radiation permeability of which changes due to the application of an electric voltage (electrochromism), changed light conditions (photochromism) or heating (thermochromism). A window made of intelligent glass can have several sections or areas that can be actuated differently and tinted differently.

It is particularly preferable that the shading device has several shading panels, preferably arranged in the manner of a matrix, wherein at least two, preferably at least four, shading increments can be set for each shading panel.

It can be provided here that the shading panels in totality can completely cover a (large) viewing opening.

The individual shading panels can have different sizes. In order to enable a simple actuation and a targeted and detailed shading, it is preferable that the individual shading panels have the same size. For example, the shading panels can have a size of between 1.5 m$^2$ and 25 cm$^2$, preferably of between 2000 cm$^2$ and 100 cm$^2$.

Furthermore, it is preferable that the illumination device has a lighting means, for example a light-emitting diode, a support, which is preferably integrated, suspended or standalone, and a power supply means. The lighting means can be dimmable or only have two states (off/on). The light distribution can be variable (for example the direct component and the indirect component of a standalone light can be taken into account).

The interaction of the person with the entire system (in particular with the control unit) can be effected via a computer or also via a smartphone app. These thus serve as a user interface.

The control unit (central computation unit) is preferably formed as a switch cabinet with an arithmetic unit and modules connectable to the arithmetic unit for the illumination device and for the shading device. Other inputs and outputs can also be provided.

Preferably, the user interface (including monitor and input means) is connected in terms of signalling to the control unit.

It may also be mentioned that the determination of the various parameters is effected in real time. This means that all parameters are detected afresh and updated at regular intervals, whereby movements of the person(s) can also be taken into account accordingly in the control of the system.

Protection is also sought for a building automation system for monitoring, controlling and adjusting facilities in a building with a shading and illumination system according to the invention.

In addition to the shading devices and illumination devices, facilities of this kind belonging to the building automation system can also be the air-conditioning systems, heating, electronics etc. As basic technical elements, the building automation system can have automation equipment (e.g. DDC-BAS control units), a switch cabinet, field devices (such as sensors and actuators), room automation systems, cabling and bus systems, servers and gateways as well as management and operating facilities.

The KNX standard for a field bus of the building automation can be used as a basis, for example.

Important points and preferred embodiments of the invention are mentioned again below in other words.

The invention describes a system for the model-based predictive control of a discretized shading and illumination system with the target requirement of satisfying visual ergonomic requirements and energy optimization. This discretization can be effected in a variety of ways: by a lamellar curtain, which has two different angular positions vertically; by adjacent curtains, which can be moved independently of one another; by a fabric curtain, which can be moved in strips; or by dynamic glass, which is actuatable as a pixel array, wherein two vertical sections are to be interpreted as two pixels. For example, closing a single façade pixel can be sufficient to achieve this optimum.

It is possible with the invention to prevent glare (part of visual comfort) of a person located in the room in any time resolution, from any working point and any viewing direction.

It is now possible to take the solar energy flows through the façade into account (radiometric and photometric).

The energy requirement for artificial light can also be taken into account.

In particular, the current position (x, y, z in the coordinate system) and the viewing direction ($x_{view}$, $y_{view}$, $z_{view}$) of the person in relation to the environment are reacted to and the optimal configurations are found which can be found with respect to visual ergonomics (e.g. visual comfort) and energy flows into and out of the building.

The sensor component (internal sensor) can be positioned anywhere in the room, thus e.g. mounted on the ceiling or clipped onto monitors.

The at least one internal sensor preferably comprises a measuring system in the form of presence or movement detectors with which even rapid human gestures or body part movements can be detected.

The localization of the persons present, in particular their head position, viewing direction and posture can be effected by sound waves or electromagnetic waves (also optically by photography) and artificial intelligence in a building-wide coordinate system.

The localization of the workstation environment in the room, in particular displays, monitors, work surfaces, tables and chairs is effected by the aforesaid technologies.

Façade properties (window position, sunshade, daylight system, etc.) are likewise detected by an aforesaid technology or e.g. on the basis of planning data.

The detection of the outside space is effected by known sensor systems, which measure direct components and diffuse components of the irradiation and illumination and measure or estimate a degree of cloudiness, preferably including the surrounding buildings from e.g. planning data or survey work.

The calculation of the photometric effects related to the viewpoint found and viewing direction of the person is effected depending on the façade configuration (windows), e.g. by backward ray tracing methods (e.g. view matrix of the Radiance 3-phase method), forward ray tracing methods, radiosity methods, estimation of the vertical illuminance or the like.

The calculation of the energy flows for each possible façade configuration is effected in the central or decentralized arithmetic unit (control unit).

The use of temperature sensors internally and externally is possible.

The optimal setting of the components (e.g. façade, artificial light) is preferably also found from the perspectives of energy requirement and visual ergonomics via the arithmetic unit according to mathematical target optimization methods.

Digital or analogue movement commands can be sent to the façade system (shading device) and artificial light system (illumination device).

The control of the system can be effected by e.g. bidirectional data exchange between illumination device, shading device and control unit. To this end, reference can be made again to the above-mentioned EP 2 760 164 B1.

The person localization can also be used for gesture control.

The internal sensor (e.g. in the form of a ToF camera) detects the geometry and reflection properties in relation to a visible reference field. This reference field has defined diffuse reflection properties and is used to calibrate the intensity image of an optical measuring device (e.g. time of flight).

From the 3D data, the model-based control system produces a model, including estimated reflectances of the room. Using the model of the outside space, from planning data including topography and the current state of the sky, the control module can select energy-optimal configurations.

The energy requirement for artificial light can be recognized in a teaching process. To this end, for example, a monitoring of the power consumption of the illumination device and a measurement of the illuminance (artificial light system) are effected.

The daylight input is determined using common factor methods (e.g. daylight factors, 3-phase method).

In the time step, the model-based control system optimizes, for example, between various configurations (see the different switched shading panels further below in FIGS. 2 and 3).

The positioning of the lamella curtain can be discretized by different tilt angles over the curtain height: for example, 0° in the topmost area, 45° above half height, 0° below half height and raised so that the lowest area is completely open.

Switchable glass panes can be adjusted continuously in terms of transmission behaviour, from maximum to near zero. For example, the glass can be actuated separately in three areas.

The positioning of this discretizable shading device makes sense above all using a model-based automatic system. The diversity of the solution space is enormous, e.g. in said representation according to FIGS. 2 and 3 the façade element is represented by 5×4 elements (shading panels). If each of these elements supports only three degrees of freedom (open, 50%, 0% transmission), the solution space is $3^{20}$.

Two target functions by way of example could now be:
minimizing the cooling energy requirement: for this, the shading device can be closed during the day in summer and in the absence of persons. When a person is present, the energy input by artificial light is juxtaposed with the solar input. The same movement command can then be transmitted over the entire façade or the entire shading device.
optimizing comfort: here the energy requirement is treated as a lower priority.

Since there are no global optima, finding the solution is predefined by a preference setting of the person(s) located in the room: for example, the person can set that they are sensitive to glare, or on the contrary would like it to be very bright.

BRIEF DESCRIPTION OF THE DRAWINGS

Further details and advantages of the present invention are explained in more detail below with reference to the embodiments represented in the drawings, in which:

FIG. 7 shows a matrix with 145 fields, and FIG. 8 shows a formula for the 3-phase method by way of example.

DETAILED DESCRIPTION OF THE INVENTION

Figure 1:
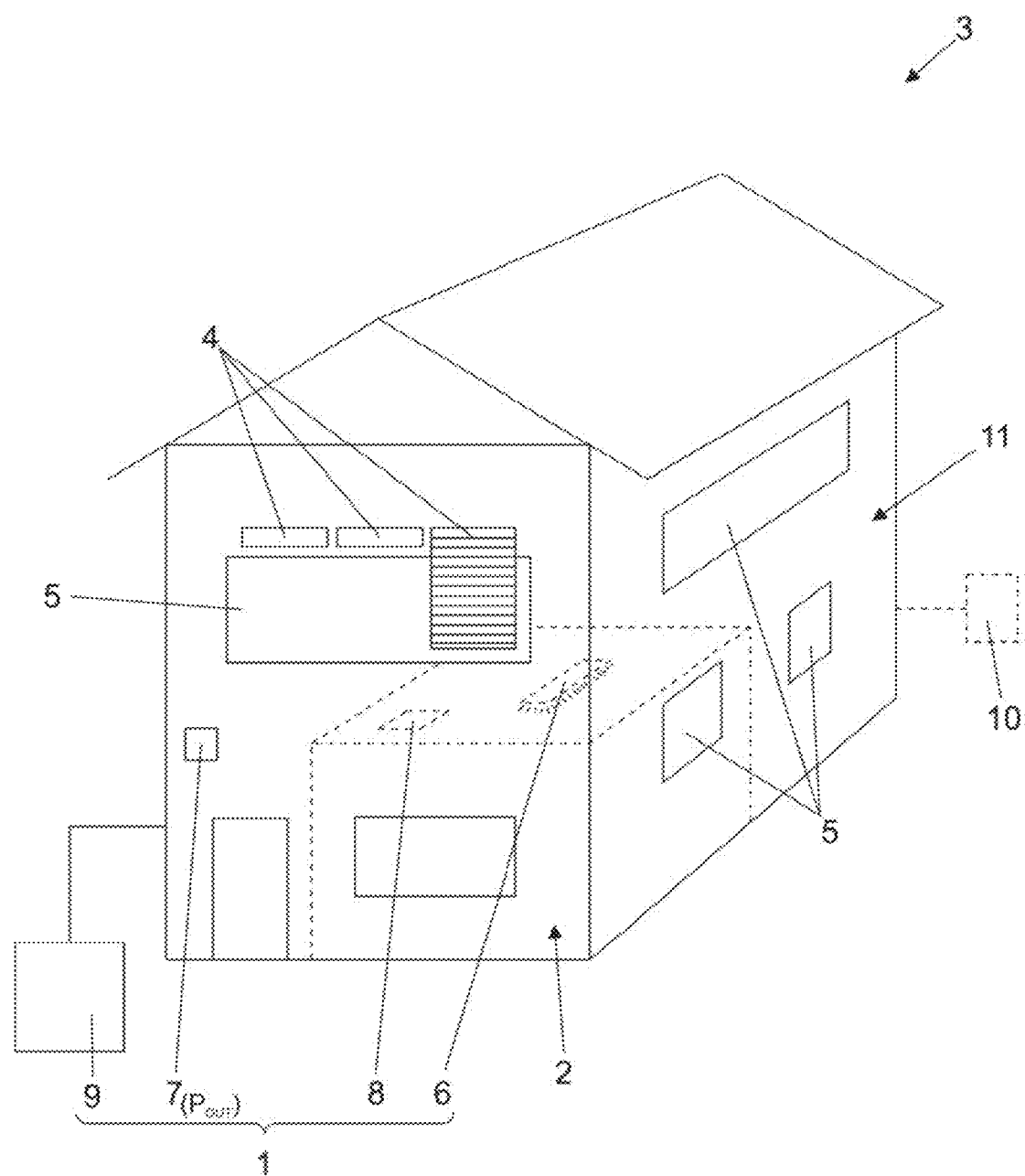
FIG. 1, schematically shows a building with a shading and illumination system, FIGS. 2+3, schematically shows a room with differently activated shading panels.

FIG. 1 schematically shows a building 3 (e.g. an office block) with an external façade 11. A plurality of viewing openings 5 are formed in this external façade 11. These viewing openings 5 can be formed as windows.

The majority of these viewing openings 5 are provided with a shading device 4. It is indicated schematically that a shading device 4 in the form of a lamellar curtain (e.g. a venetian blind) is lowered.

At least one room 2 (indicated by the dashed lines) is formed in the building 3. An (artificial) illumination device 6 is arranged in this room 2.

In addition, at least one internal sensor 8 is arranged in this room 2.

Outside the room 2 (e.g. on the external façade 11) there is an external sensor 7 for detecting at least one external parameter $P_{out}$ acting on the room 2 from outside.

Furthermore, a control unit 9 is provided for actuating the at least one shading device 4 and the at least one illumination device 6.

The shading device 4, the illumination device 6, the external sensor 7, the internal sensor 8 and the control unit 9 together form the shading and illumination system 1 for the room 2 of the building 3.

It is also indicated in FIG. 1 that the building 3 has a building automation system 10 for monitoring, controlling and adjusting facilities in the building 3. The shading and illumination system 1 can be an integral constituent of this building automation system 10.

A room 2 in a building 3 is represented schematically in FIG. 2, wherein this room 2 has a shading and illumination system 1.

Furniture 12 (e.g. a desk) is arranged in the room 2. A person P sits at this furniture 12 formed as a desk.

A monitor 13 is arranged on the desk. This monitor 13 can act as a user interface for the control unit 9.

An internal sensor 8 is arranged on the ceiling of the room 2. This internal sensor 8 is configured to detect a 3D image 3D of the room 2, at least one position x, y, z of the person P located in the room 2 in this 3D image 3D and a viewing direction $x_{view}$, $y_{view}$, $z_{view}$ of this at least one person P.

In addition, an illumination device 6 is located on the ceiling of the room 2, wherein two lamps of this illumination device 6 are represented in this case.

Furthermore, a further sensor 14 is arranged on the ceiling of the room 2. This sensor 14 serves with its detected values to control the luminous flux at target illuminances. This type of sensor is generally termed a look-down sensor. This sensor 14 can also be part of the internal sensor 8.

Optical properties (e.g. reflectances) of surfaces (furniture surface 15 and floor surface 16) can also be detected by the internal sensor 8.

Outside the room 2, the sun 17 is indicated schematically. The state of the sun 17 can be read from a world coordinate system and is set relative to the room 2. Sun rays S1, S2 and S3 penetrate the room 2 through the viewing opening 5 and fall on the person P. The sun ray S1 falls directly on the face of the person P and results in glare. The sun ray S2 is reflected via the furniture part surface 15 onto the person P.

The sun ray S3 results in glare for the person P via a reflection on the floor surface 16.

An external sensor 7 is arranged on the outside of the room 2. The control unit 9 is indicated schematically in the room 2. The individual components of the shading and illumination system 1 have a signalling connection to one another.

Starting from the detected viewing direction $x_{view}$, $y_{view}$, $z_{view}$ and from the detected position x, y, z of the person P and from the 3D image (reference sign 3D) of the room 2 and depending on the at least one external parameter $P_{out}$, the control unit 9 is configured to determine a light parameter L acting on the person P, in particular on the face of the person P. This light parameter L is then used by the control unit 9 again as a basis for the actuation of the at least one shading device 4 and/or of the at least one illumination device 6.

In the embodiment example represented in FIG. 2, the shading device 4 is formed as a window with an intelligent glass pane. This intelligent glass pane is divided in this case into 4×5 shading panels 4.1 to 4.20. To retain clarity, only the shading panels 4.1, 4.3 and 4.14 are given reference signs. The shading panels 4.1 to 4.20 together form the shading device 4.

Each shading panel 4.1 to 4.20 can assume several—in this case six—different shading settings A, B, C, D, E and F. In the shading setting A, there is no dimming or tinting of the corresponding panel. In the shading setting F, there is maximum dimming of the corresponding panel. The shading settings B, C, D and E form different shading stages (e.g. 20%, 40%, 60% and 80%) of maximum dimming.

If the shading panels 4.1 to 4.20 are part of an intelligent glass pane—as depicted—it is possible to set them in 1% increments or finer shading increments (with 1% increments there are 101 shading settings).

However, shading panels 4.1 to 4.n can also be produced—in contrast to the representation in FIG. 2—via mechanical shading elements. Thus, a window front can be covered by several venetian blinds, for example. Each window of this window front thus forms its own shading panel 4.1 to 4.n. In addition, this single window can be subdivided in itself again. Thus, the venetian blind can be lowered to a varying extent, resulting in another shading increment. In addition, the lamellae of the venetian blind can assume different angular positions (e.g. 15° and 45° and) 90°, resulting in several shading increments A to F.

As illustrated in FIG. 2, the two panels with the shading increment F serve to ensure that the rays S2 and S3—which would otherwise lead to reflection glare via surfaces of the room 2—are kept from penetrating the room 2 or at least the incident intensity is reduced. The sun rays S1 falling directly on the person P can also be mitigated by corresponding shading of the panels. Complete dimming is not necessary here, however, as due to the current viewing direction the sun is only in the field of view very laterally. For the detected viewing direction $x_{view}$, $y_{view}$, $z_{view}$ the reflected sun rays S2 and S3 incident from below are more uncomfortable for the person P, which is why these are dimmed more strongly.

Of course, other settings can also be made here according to individual wishes.

Such shadings and settings are not limited to intelligent glass either. On the contrary, this can also work in the same way in the case of shading devices 4 in the form of venetian blinds, roller shutters etc.

However, not only can the shading device 4 be actuated in this way depending on the detected light parameter L, but the illumination device 6 can also be actuated correspondingly. Thus, in the event of sun rays S1 falling frontally on the face, complete dimming via the shading device 4 can be necessary, wherein, however, the illumination device 6 then has to be turned on more strongly again.

A further embodiment example of a shading/illumination system 1 for a room 2 of a building 3 is represented in FIG. 3, wherein a different setting has been made for the shading here. Based on other basic settings or based on individual settings of the person P located in the room 2, a different shading via the shading device 4 can result, in the case of the same external parameters $P_{out}$.

Thus, the shading panel 4.8 is completely dimmed with the shading increment F. Direct solar radiation onto the head of the person P is thereby prevented. At the same time, however, the shading panel 4.3 arranged above it is not dimmed at all (shading increment A). Furthermore, in these settings, the shading panels 4.12 to 4.14 are set at shading increment C, so that greater reflection via the sun ray S2 is permitted. The shading panels 4.4, 4.5, 4.9 and 4.10, however, are set to the shading increment E.

Figure 4:
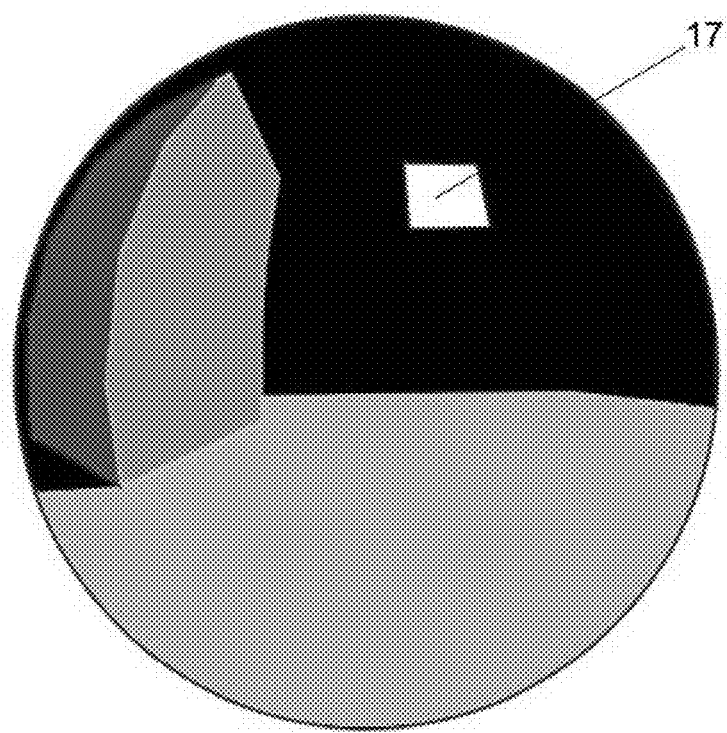
FIG. 4 shows a field of view with a building and the sun.
Figure 5:
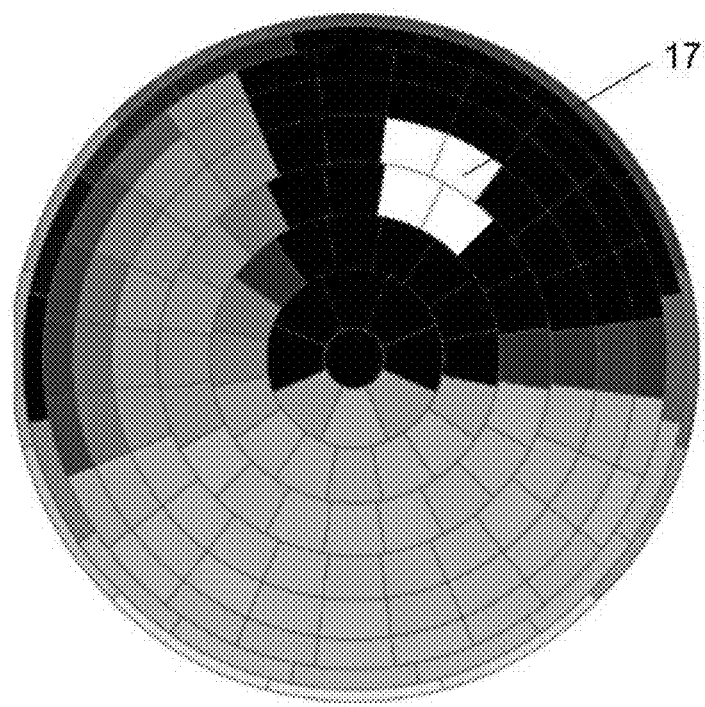
FIG. 5 shows the field of view from FIG. 4 with light parameters overlaid with a matrix, FIG. 6, schematically shows a room together with outside world, and the matrices of the 3-phase method.

In FIGS. 4 and 5, a possible embodiment for determining the light parameter L is examined in more detail. In FIG. 4, a field of view (hemispherical, spanning 180°) of a person P, who is standing in the outside space in this case, is represented schematically, wherein a building stands in the left area, the ground is in the lower area and the sun 17 is in the upper middle area, with approx. half a degree of magnitude and the much larger, very bright area around the sun. The brightness of the sun 17 itself has already been transferred in this representation according to FIG. 4 into a discretization of the firmament, which is why the representation of the sun 17 is a square solid angle region.

A matrix can be laid over this field of view (see FIG. 5), in this case a matrix with 145 fields. This representation is to reproduce the view matrix of the 3-phase method in the backward ray tracing software package radiance. The area of the sun 17 in FIG. 4 is now divided into these matrix fields. Then—as represented in FIG. 5—a particular value (e.g. the illuminance) is generated for each field and the sum of all field contributions is calculated. The glare potential can be evaluated from this. Above all, the matrix fields in the area of the sun 17 are primarily responsible for glare. The grey surfaces of the remainder of the world in the field of view, on the other hand, are not critical for glare.

This view matrix in FIG. 5 is to be calculated for every current viewpoint and the current viewing direction.

In FIG. 6, a room is represented schematically in relation to the outside world, wherein this is used to explain the 3-phase method.

In the 3-phase method (Radiance), the transfer from a discrete area of the sky (sky matrix S) to a calculation point in the room is calculated via three matrices. The daylight matrix D describes in discrete grids how much of the discrete sky (sky matrix S) is to be seen from the façade point. The transmission matrix T in turn describes in a discretized manner how much is transferred from a half space area outside to another half space inside. The view matrix V describes in a discretized manner how much from the calculation point enters from the half space.

The discretization can be effected in 145 areas. To this end, such a grid is represented by way of example in FIG. 7 with 145 fields.

A calculation formula for the illuminance is indicated by way of example in FIG. 8.

The illuminance at n calculation points can be calculated by means of matrix multiplication. It is thus a function of V, T, D and S, f(V,T,D,S).

More precise expansions of the 3-phase method are available in the science.

While the matrices V, D and S are constant in the time step, T can now be varied. The variation describes all possible settings of the shading and illumination system. For each setting a parameter is now calculated, specifically for glare $L_i$=f(V,T,D,S), or for illuminance $E_i$=f(V,T,D,S) or for the solar input Q of the energy input based on an external irradiance and the value g (angle-dependent overall energy transmittance characteristic). Depending on the target function, the optimal façade setting is selected and the shading device 4 and the illumination device 6 are finally activated.

The 3-phase method can be expanded to five or six phases by including further transfer properties. Other methods can, of course, also be used.

As a result, the sky state (sky matrix S) then changes in a next time step and the optimization is effected afresh. The view matrix V has possibly also changed, whereby a change in the shading or illumination can result again. For example, in the case of dimming of the desk that is too strong, the illumination device 6 in the area of the desk can automatically be switched to brighter.

LIST OF REFERENCE SIGNS

1 Shading and illumination system
2 Room
3 Building
4 Shading device
4.1 to 4.n Shading panels
5 Viewing openings
6 Illumination device
7 External sensor
8 Internal sensor
9 Control unit
10 Building automation system
11 External façade
12 Furniture (desk)
13 Monitor
14 Sensor
15 Furniture surface
16 Floor surface
17 Sun
$P_{out}$ External parameter
3D 3D image
x, y, z Position of the person in the room
P Person
$x_{view}$, $y_{view}$, $z_{view}$ Viewing direction
L Light parameter
S1, S2, S3 Sun rays
A, B, C, D, E, F Shading increments
V View matrix
T Transmission matrix
D Daylight matrix
S Sky matrix

The invention claimed is:

1. A shading and illumination system for a room in a building, comprising:
   at least one shading device configured to shade viewing openings of the building;
   at least one illumination device configured to illuminate the room;
   at least one external sensor configured to detect at least one external parameter (Pout) acting on the room from outside;
   at least one internal sensor configured to detect
   a 3D image of the room, at least one position of a person present in the room in the 3D image, and a viewing direction of the person; and a control unit configured to actuate the at least one shading device and the at least one illumination device, wherein the at least one shading device and the at least one illumination device are actuatable by the control unit depending on the at least one external parameter detected by the at least one external sensor and the 3D image, the at least one position and the viewing direction detected by the at least one internal sensor, wherein the control unit is configured to determine a light parameter acting on the person based on the detected viewing direction, the detected at least one position, the detected 3D image of the room, and the detected at least one external parameter, and wherein the at least one shading device or the at least one illumination device is actuatable depending on the light parameter acting on the person.

2. The shading and illumination system according to claim 1, wherein the at least one external parameter is based on an irradiance, an illuminance, a radiation density, or an external temperature.

3. The shading and illumination system according to claim 2, wherein the at least one external parameter represents values measured or calculated by the external sensor, conditions based on the irradiance, the illuminance, the radiation density, or the external temperature.

4. The shading and illumination system according to claim 1, wherein the at least one external sensor is a pyranometer.

5. The shading and illumination system according to claim 1, wherein the at least one internal sensor configured to detect the 3D image is a ToF camera.

6. The shading and illumination system according to claim 1, wherein the at least one internal sensor includes a plurality of internal sensors arranged in the room and configured to detect a plurality of persons.

7. The shading and illumination system according to claim 1, wherein the 3D image contains surfaces of the room arranged in a coordinate system, wherein the at least one internal sensor is configured to determine reflectances of the surfaces of the room.

8. The shading and illumination system according to claim 7, wherein the at least one internal sensor is configured to determine the reflectances of the surfaces of the room by estimation or calculation.

9. The shading and illumination system according to claim 1, wherein the light parameter corresponds to an illumination parameter, and wherein the illumination parameter is defined by a vertical illuminance.

10. The shading and illumination system according to claim 1, wherein the light parameter corresponds to a glare parameter, and wherein the glare parameter is defined based on a daylight glare probability or an approximation method of glare metrics.

11. The shading and illumination system according to claim 1, wherein the at least one shading device is formed as a mechanical shading element, as a curtain, as an awning or as a roller shutter, or as intelligent glass.

12. The shading and illumination system according to claim 11, wherein the at least one shading device is formed as the mechanical shading element, and the mechanical shading element is a venetian blind.

13. The shading and illumination system according to claim 1, wherein the at least one shading device has several a plurality of shading panels, and wherein at least two shading increments can be set for each shading panel.

14. The shading and illumination system according to claim 13, wherein the plurality of shading panels arranged in the manner of a matrix, and wherein at least four shading increments can be set for each shading panel.

15. The shading and illumination system according to claim 1, wherein the illumination device has a light source, a support, and a power supply.

16. The shading and illumination system according to claim 15, wherein the light source comprises a light-emitting diode, and wherein the support is integrated, mounted, suspended or standalone.

17. The shading and illumination system according to claim 1, wherein the control unit is formed as a switch cabinet with an arithmetic unit and modules connectable to the arithmetic unit for the at least one illumination device and for the at least one shading device.

18. A building automation system for monitoring, controlling and adjusting facilities in a building with the shading and illumination system according to claim 1.

19. The shading and illumination system according to claim 1, wherein the at least one shading device is configured to shade windows of the building, and wherein the light parameter is a light parameter acting on an eye of the person.

* * * * *